Sept. 15, 1970 J. F. LANCASTER 3,529,264

SHIELDED ELECTRICAL SWITCHING JACK WITH IMPEDANCE BALANCING NETWORK

Filed Dec. 7, 1967 3 Sheets-Sheet 1

INVENTOR

Jesse F. Lancaster

BY Strauch, Nolan, Neale, Nies & Kurz

ATTORNEYS

INVENTOR
Jesse F. Lancaster

BY Strauch, Nolan, Neale, Nies & Kurz
ATTORNEYS

INVENTOR
Jesse F. Lancaster

BY Strauch, Nolan, Neale, Nies & Kurz
ATTORNEYS

United States Patent Office 3,529,264

Patented Sept. 15, 1970

3,529,264

SHIELDED ELECTRICAL SWITCHING JACK WITH IMPEDANCE BALANCING NETWORK

Jesse F. Lancaster, Great Falls, Va., assignor to Cook Engineering Company, Alexandria, Va., a corporation Filed Dec. 7, 1967, Ser. No. 692,625
Int. Cl. H01p *1/10;* H02j *9/04*
U.S. Cl. 333—7 19 Claims

ABSTRACT OF THE DISCLOSURE

An electrical switching jack device for use in circuit patchfields and having input and output terminals electrically interconnected through a first internal contact assembly. The shields on coaxial type conductors which are connected to the terminals are adapted to be electrically interconnected through a second internal contact assembly to establish electrical continuity. A plug connected on the end of a further shielded conductor is operative upon insertion into one of a pair of female connector receptacles of the switching device to interrupt the normal through circuit between the input and output terminals by actuating the first contact assembly, to electrically connect either the input or output terminals to the plug-connected conductor depending upon which female receptacle it is inserted into, to interrupt the internal connection between the conductor shields by actuating the second contact assembly, and to electrically connect the patched-in conductor shield to the shield remaining in the active circuit.

FIELD OF INVENTION

This invention relates to electrical switching devices and is particularly concerned with shielded switches which are especially applicable for patching equipment into and out of audio circuits.

BACKGROUND

In audio circuits it is desirable that receivers, amplifiers, and other equipment be connected in such a manner that they can be removed or patched-out of the active circuit for repairs and that standby equipment be installed or patched into the active circuit to continue operation without material interruption.

Prior switching jacks, such as that described in U.S. Pat. No. 3,036,169, have been found to be unsatisfactory because they cause objectionable increases in the noise level and cross-talk level when operated to patch standby components into the active circuit. Noise is defined herein to be a phenomenon which may be caused by any time or space varying quantity that may be mixed with the desired source signal in such a way that it tends to reduce the quality of the signal. Cross-talk is caused by signals which stray between separate channels or networks in an audio circuit or the like.

Conventionally, shielded, coaxial-type conductors are used to interconnect audio circuit components such as receivers and audio amplifiers to reduce cross-talk and noise pickup. Cross-talk and noise pickup are minimized by extending the shield continuously for the full length of the electrical conductor connection between two electrically connected components and by grounding the shield at the components.

When a patchfield is provided with a conventional, normal through switching jack assembly such as the one described in Pat. No. 3,036,169 for electrically connecting the components together, the electrical continuity of the shield from one component to the other is not maintained for the normal through condition where the standby equipment is disconnected from the active circuit. In other words, the shield of the conductor which interconnects an output terminal of one component and the input terminal of the switching jack assembly is not electrically connected to the shield of the conductor which electrically interconnects the output terminal of the switching jack assembly and the input terminal of the next in-circuit component.

Also, the switching assembly of the patent mentioned above does not electrically tie together the grounded conductor shields on patched circuits. In other words, the conductor shield extending from a standby component is not electrically connected to the conductor shield extending from an in-circuit component when the standby component is patched into the active circuit.

The foregoing conditions, it was found, resulted in a higher level of cross-talk and noise pick-up as compared with circuit connections wherein the electrical continuity of the shield is maintained. Equally objectionable is the situation where the continuity of the shield is maintained between a component which is patched out of the circuit and a component remaining in the active circuit. This condition tends to generate unwanted ground loops to impair the quality of the desired signal.

SUMMARY AND OBJECTS OF THE INVENTION

The present invention overcomes the foregoing disadvantages of prior patchfield switches by providing a novel switching jack assembly wherein improved shielding reduces crosstalk and noise pick-up between circuits. For a normal through condition wherein the standby equipment is patched out of the active circuit, electrical continuity of the ground shield is maintained between the networks or components which are electrically interconnected by the jack assembly of this invention. The switching assembly of this invention furthermore has a novel terminal and switch contact arrangement whereby the ground shields for standby equipment are electrically tied to the ground shields for the components or networks remaining in the active circuit. This novel terminal and switch contact arrangement is operative to interrupt continuity between the shields associated with patched-out equipment and the shields remaining in the active circuit when the equipment is patched out in a switching operation. As a consequence, cross-talk and noise pickup are reduced.

The switching jack assembly of this invention is provided with an impedance, the value of which is selected to match that of the interconnected networks in an impedance-balanced circuit. For example, it is common practice to match the impedance of a source such as a radio receiver with the input or load impedance of the audio amplifier to obtain maximum operating efficiency.

It was found that when patched-out audio equipment such as the amplifier is not terminated in a matched impedance, unwanted ambient system noise is induced into the active circuit to interfere with the quality of the desired signal. This objectionable condition is avoided according to the present invention by arranging the contact assembly which is actuated by inserting a male connector plug to connect those switching jack terminals, which are connected to the patched-out equipment, to the terminals of the impedance in the switching device. As a result, the equipment which is patched-out is terminated in an impedance-balancing resistor.

Accordingly, a primary object of this invention is to provide a novel shielded electrical switching assembly which is particularly useful in audio patchfields and which permits equipment to quickly and easily be installed in and removed from the active circuit.

Another important object is to provide an improved, shielded electrical switching jack assembly which reduces crosstalk between circuits and which permits the mixing of high and low level audio circuits in a common patchfield.

Still another important object is to provide a novel shielded electrical switching jack having an impedance balancing network in which the patched-out equipment is is terminated to reduce ambient system noise.

A further object is to provide a novel shielded electrical switch capable of establishing electrical continuity between the conductor ground shield of patched-in equipment and the conductor ground shield of equipment remaining in the active circuit.

Other objects and advantages of the invention will become apparent from the following description of the drawings and the appended claims.

DESCRIPTION OF PREFERRED EMBODIMENT

Figures 1, 5, 6:
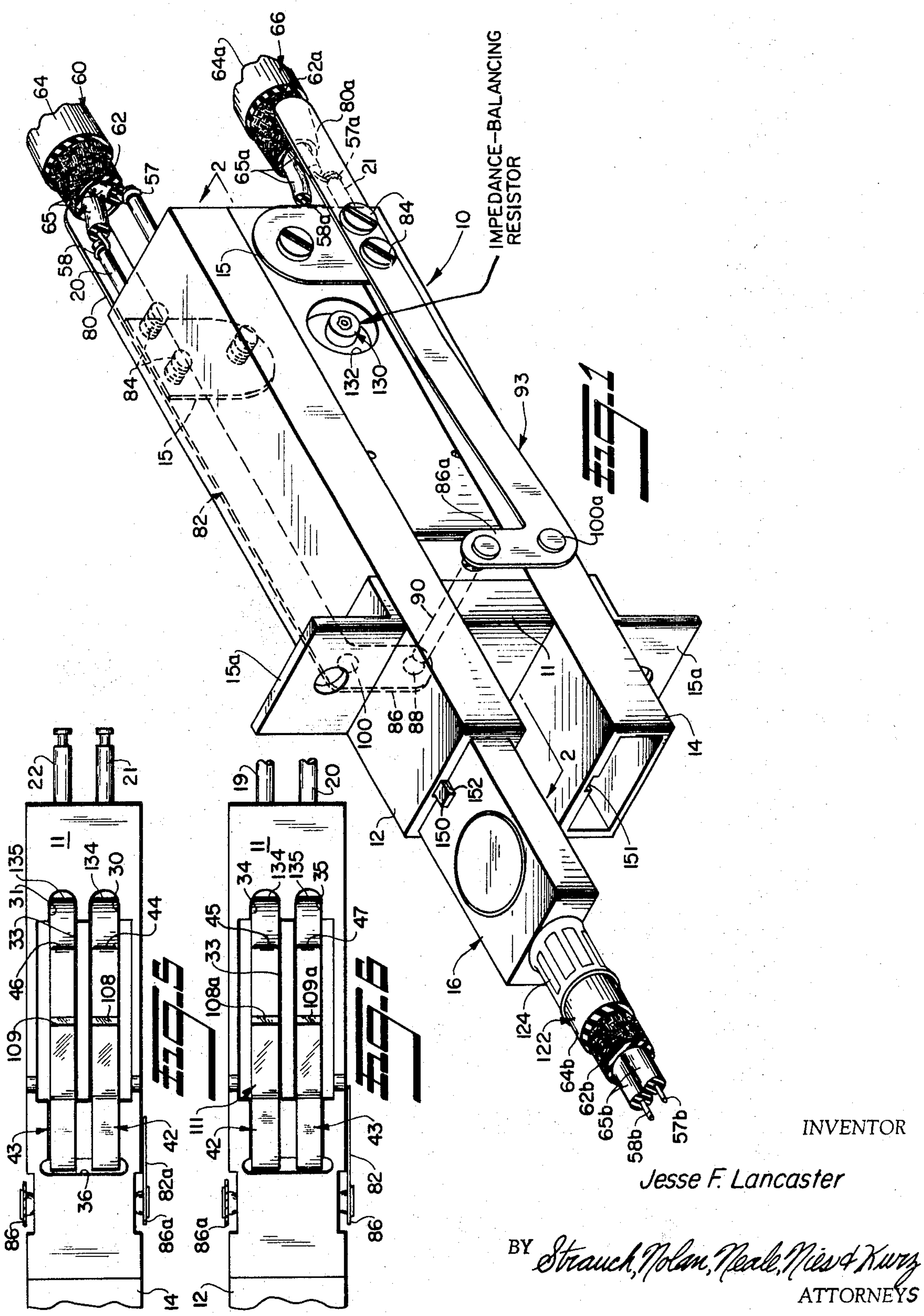
FIG. 1 is a perspective view of the novel electrical switch according to a preferred embodiment of this invention.
FIGS. 5 and 6 are sections taken respectively along lines 5—5 and 6—6 of FIG. 2.

Referring to FIG. 1, the patchfield switching jack assembly 10 of this invention comprises a support block or body 11 made of electrically non-conductive material and a pair of electrically conductive metallic female receptacles or sleeves 12 and 14. Support block 11 is of flat-sided, rectangular configuration and may be made from plastic. Sleeves 12 and 14, in this embodiment, are rectangular in cross section and interfittingly seat against oppositely facing surfaces of block 11. The longitudinal axes of sleeves 12 and 14 are parallel. Any suitable means, such as bracket and screw assemblies 15 are provided to rigidly secure sleeves 12 and 14 to block 11. Support brackets **15*a* are fixed to sleeves 12 and 14 for mounting assembly 10** in a cabinet or the like.

Figures 2, 3, 4, 7:
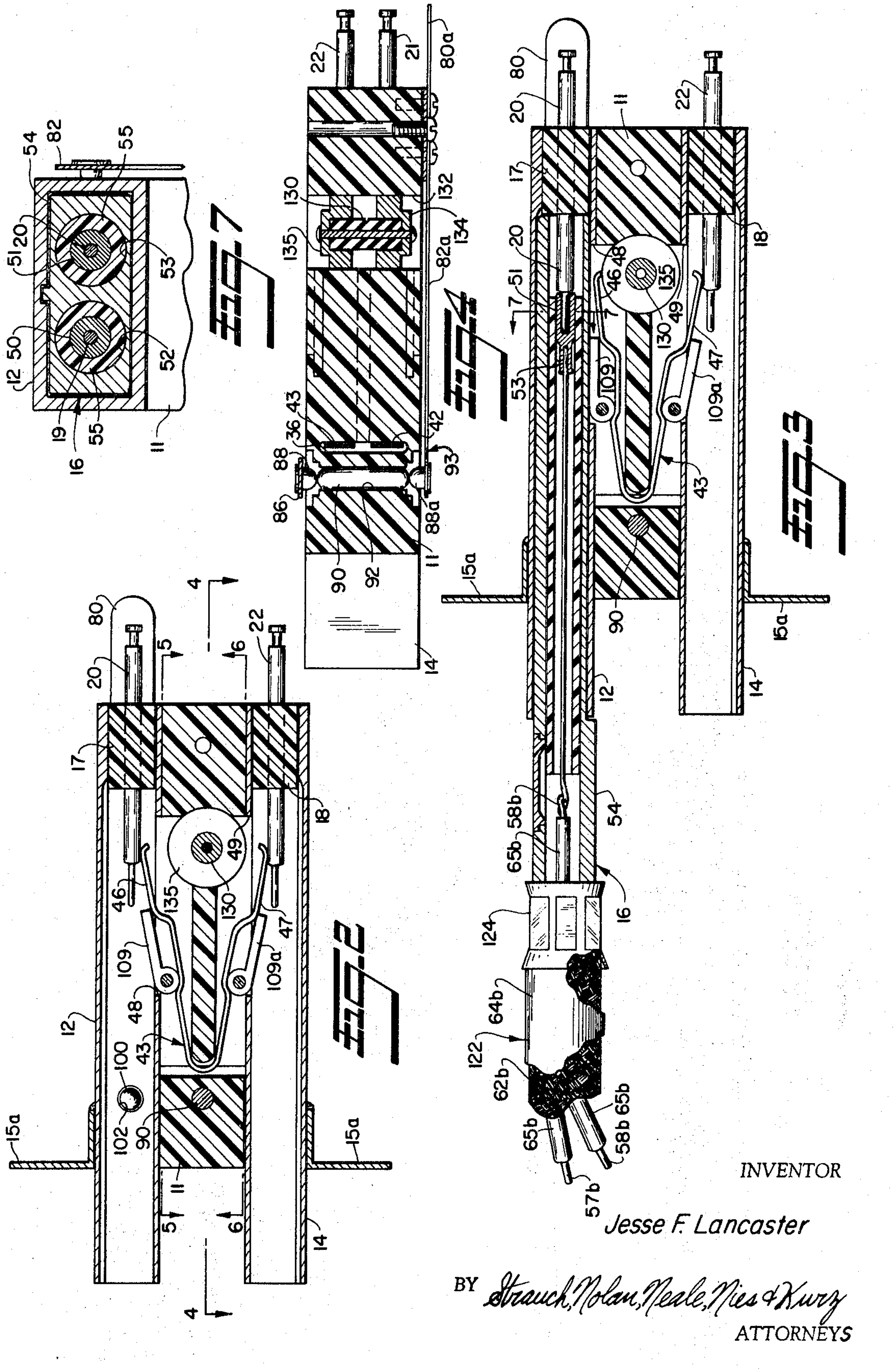
FIG. 2 is a section taken substantially along lines 2—2 of FIG. 1 and illustrating the normal-through circuit condition wherein the patch plugs are removed.
FIG. 3 is a section similar to FIG. 2, but showing a patch plug inserted into one female connector of the jack assembly to interrupt the normal-through circuit.
FIG. 4 is a section taken substantially along lines 4—4 of FIG. 2 and illustrating the normal-through ground shield connection as well as the impedance balancing network.
FIG. 7 is a transverse section of the male connector plug shown in FIGS. 1 and 2.

Sleeves 12 and 14 are open at corresponding ends to each sildably receive a male patchcord plug 16. The opposite ends of sleeves 12 and 14, as shown in FIG. 2, are respectively closed by electrical insulator blocks 17 and 18 which may be formed from a suitable plastic. A pair of electrical terminal or contact pins 19 and 20 extend through and are fixed to block 17 in parallel spaced apart relation. Similarly, electrical terminal or contact pins 21 and 22 extend through and are fixed to block 18 in parallel spaced apart relation. Pins 19 and 20 are electrically insulated from each other by block 17, and pins 21 and 22 likewise are electrically insulated from each other by block 18. Each of the pins 19–22 has an exterior electrical conductor terminal connection end projecting beyond its associated sleeve and an inner contact pin end received within its associated sleeve. The longitudinal axes of pins 19–22 are parallel with the longitudinal axes of their respective sleeves 12 and 14.

The outer ends of pins 19–22 provide the signal input and output terminal connections for assembly 10. For example, the terminal ends of pins 19 and 20 may be connected as input terminals to a signal source or electrical network, and the terminal ends of pins 21 and 22 may be connected as output terminals to couple the signal condition to another electrical network.

As best shown in FIGS. 5 and 6, support block 11 is formed with a pair of top longitudinally elongated recesses 30 and 31 (FIG. 5) which open toward the underside of sleeve 12 and which are divided by a longitudinal partition 33 forming a part of block 11. On its opposite side, block 11 is formed with a similar pair of longitudinally elongated recesses 34 and 35 which are also separated by partition 33. Recesses 34 and 35 align with recesses 30 and 31 respectively and open toward the underside of sleeve 14. A slot 36 extending through block 11 opens at one end into the forward ends of recesses 30 and 31 and at its opposite end into the forward ends of recesses 34 and 35.

Still referring to FIGS. 5 and 6, a pair of flatsided, generally U-shaped, electrically conductive, flexure contacts springs 42 and 43 extend in parallel spaced apart relation through slot 36. Spring 42 is formed with outwardly biased contact arms 44 and 45. Spring 43 similarly is formed with outwardly biased or flexed arms 46 and 47. Arms 44 and 46 respectively extend longitudinally through recesses 30 and 31, and the ends of arms 44 and 46 extend freely through an aperture 48 (see FIG. 2) in sleeve 12 and normally contact the inner ends of pins 19 and 20 respectively. Arms 45 and 47 respectively extend longitudinally along recesses 34 and 35, and the ends of these arms pass freely through an aperture 49 (FIG. 2) in sleeve 14 and normally contact the inner ends of pins 21 and 22 respectively.

By the foregoing simplified, relatively inexpensive construction, two separate normal through circuits are provided in assembly 10, with each circuit being electrically isolated from the other. The first circuit from pin 19 extends through spring 42 to pin 21. The other circuit from pin 20 extends through springs 43 to pin 22. Plug 16, as will be described in detail shortly, is effective when slidably inserted into either sleeve 12 or sleeve 14 to interrupt both of the internal circuits mentioned above. The switch construction thus far described is symmetrical with respect to a plane medially intersectinng partition 33 and containing the longitudinal axes of sleeves 12 and 14.

Plug 16, as best shown in FIGS. 3 and 7, comprises a pair of relatively rigid, electrically conductive female contact elements 50 and 51 of elongated, tubular configuration. Contact elements 50 and 51 are adapted to coaxially receive and make peripheral contact with the pointed inner ends of pins 19 and 20 when plug 16 is inserted into sleeve 12 in the manner shown in FIG. 3.

Contact elements 50 and 51 are respectively received in small, parallel, open-ended bores 52 and 53 which are formed in side-by-side, spaced apart relation through an elongated, metallic, electrically conductive ground shield 54. Shield 54 forms a part of plug 16 and slidably interfits in either of the sleeves 12 and 14 which are of identical construction. An insulating jacket 55 covering each of the contact elements 50 and 51 in bores 52 and 53 electrically insulates elements 50 and 51 from shield 54.

Contact elements 50 and 51 terminate at their inner ends inwardly of the corresponding inner open ends of bores 52 and 53 so that when plug 16 is inserted, for example, into sleeve 12, pins 19 and 20 coaxially extend into the inner ends of bores 52 and 53 without contacting shield 54 and into the recessed, open inner ends of elements 50 and 51 with a relatively tight sliding fit. Thus the areas of elements 50 and 51 contacting pins 19 and 20 are peripherally surrounded by shield 54 to reduce noise pick-up and cross-talk.

As best shown in FIG. 3, the inner end of shield 54 when fully inserted into sleeve 12 seats against the internal face of block 17 which is interfittingly surrounded by sleeve 12. Shield 54, when inserted into sleeve 12, also covers aperture 48 to minimize noise pick-up through this region. By this construction, shield 54 cooperates with sleeve 12 to form a continuous protective shielding envelope extending from the end of sleeve 12 at pins 19 and 20 to the outer end of shield 54 which protrudes beyond sleeve 12 as shown in FIG. 3.

The sub-assembly of sleeve 14, pins 21 and 22, and block 18 is preferably identical to that of sleeve 12, pins 19 and 20 and block 17 so that plug 16 or another one of identical construction mates in sleeve 14 in the same manner just described for sleeve 12. Insertion of plug 16 into sleeve 14 therefore establishes contact between contact elements 50 and 51 and pins 21 and 22 respectively. Shield 54 will cover aperture 49, and the inner end of shield 54 will seat against block 18 to form a shielding envelope in cooperation with sleeve 14 in the same manner as explained in connection with sleeve 12. Noise pick-up and cross-talk are therefore reduced.

It will be appreciated that two plugs may concomitantly be inserted into sleeves 12 and 14 respectively. This switching connection will be described in greater detail later on.

The terminal ends of pins 19 and 20 are adapted to permanently be connected to a pair of electrical conductors 57 and 58 (see FIG. 1) by any suitable means such as soldering. Conductors 57 and 58 may form a part of a shielded, dual-wire, coaxial type cable 60 having a braided metal shield 62 which is covered by an electrical insulation jacket 64. Conductors 57 and 58 are electrically insulated from each other and from shield 62 by insulation covers indicated generally at 65. This form of cable or patchcord is conventional.

The terminal ends of pins 21 and 22 also are adapted to permanently be connected to separate electrical conductors which also may form a part of a shielded, dual-wire, coaxial-type cable 66. Cable 66 may be the same as cable 60, like reference numerals suffixed by the letter *a* being applied to designate like elements. Conductors 57*a* and 58*a* may be soldered to the terminal ends of pins 21 and 22 respectively.

Figure 9:
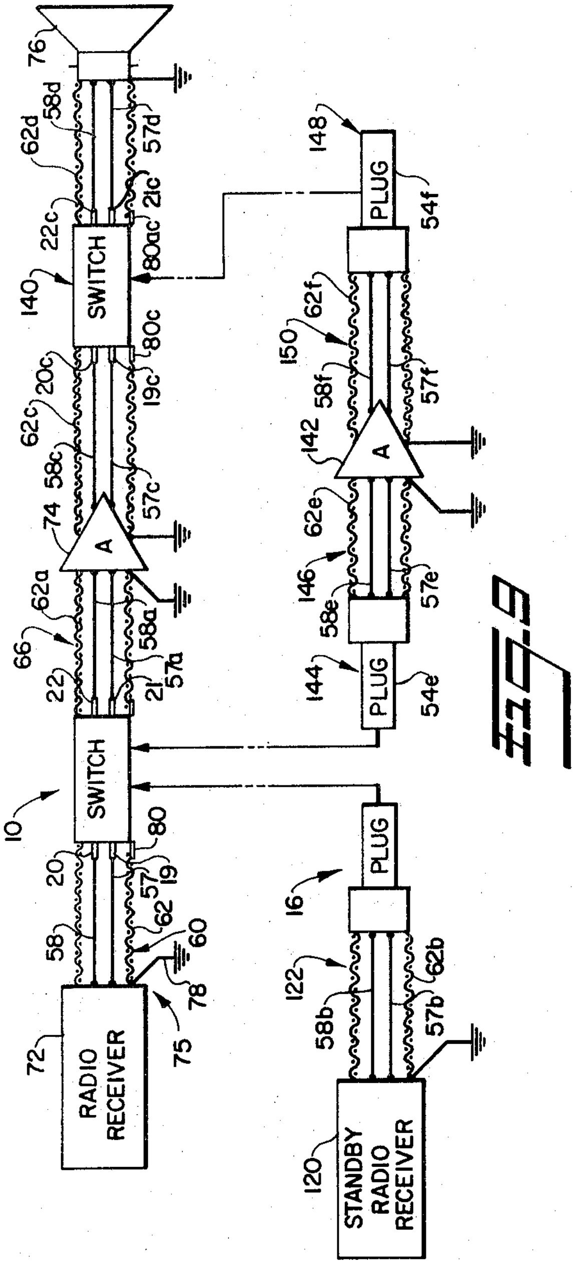
FIG. 9 is a schematic view of a typical patchfield audio system in which the switch assembly of the invention may be utilized.

As schematically shown in FIG. 9, conductors 57 and 58 may be connected in a patchfield to the output terminals of a radio receiver 72, and conductors 57*a* and 58*a* may be connected to the input terminals of an audio amplifier 74. Receiver 72 and amplifier 74 form a part of an audio circuit 75 having a speaker 76 which constitutes the load of the circuit.

Figure 8:
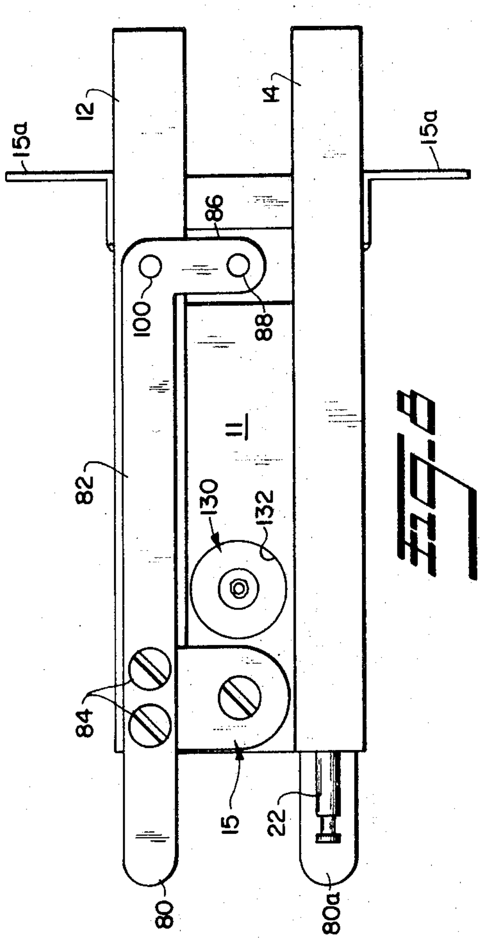
FIG. 8 is an elevation of the rearwardly facing side of the assembly shown in FIG. 1.

One end of shield 62 is conveniently grounded at receiver 72 as indicated at 78. The opposite end of shield 62, according to an important aspect of this invention, is adapted to permanently be connected, as by soldering, to a terminal 80. Terminal 80, as best shown in FIG. 8, is formed on the end of a flat-sided, electrically conductive flexure spring 82. Spring 82 is secured to sleeve 12 in cantilever fashion adjacent to terminal 80 by screws 84 which form a part of one of the assemblies 15. Spring 82 electrically contacts and extends longitudinally and exteriorly along one side of sleeve 12 and has at its free end a downwardly extending arm 86 which carries a contact 88. Contact 88 is normally biased into contact with one end of an electrically conductive contact pin 90. Pin 90 is coaxially fixed in a bore 92 (see FIG. 4) which is formed through block 11 along an axis that extends at right angles to the longitudinal axes of spring 82 and sleeves 12 and 14

Electrical continuity between contact pin 90 and shield 62*a* is established by a spring and contact unit 93 which is the same as that comprising spring 82, arm 86, and contact 88. Like reference numerals suffixed by the letter *a* have been applied to designate the parts of unit 93.

As shown in FIG. 1, spring 82*a* is on the opposite side of assembly 10 and is secured in cantilever fashion to sleeves 14 by the screws of the assembly 15 on that side. Spring 82*a* electrically contacts and extends exteriorly along the side of sleeve 14. Contact 88*a*, which is carried by arm 86 at the free end of spring 82*a*, is biased to normally contact the end of pin 90 opposite from contact 88.

Terminal 80*a* is adapted to be connected permanently to shield 62*a* as by soldering. The opposite end of shield 62*a* is conventionally grounded at the circuit component which in this example is amplifier 74.

By the foregoing arrangement it is clear that electrical continuity of the shielding for the signal-transmitting conductors is provided between the two networks or components, namely receiver 72 and amplifier 74, which are normally interconnected by assembly 10. Cross-talk and noise pick-up is therefore, reduced when assembly 10 is conditioned to provide a normal through circuit.

When plug 16 is removed from assembly 10, a normal through circuit is maintained for transmitting signals from receiver 72 to amplifier 74. Also, continuity of the conductor shielding is maintained for this normal through condition in the manner just described.

As best shown in FIGS. 1 and 2, a contact 100 is fixed on the free end of spring 82. Contact 100 is between contact 88 and terminal 80 and is normally biased by spring 82 through an aperture 102 to protrude into the interior of sleeve 12. When plug 16 is inserted into sleeve 12, shield 54 slidably engages contact 100, forcing or camming the contact outwardly from the sleeve interior. As a result, the free end of spring 82 is flexed outwardly to separate contact 88 from pin 90. Circuit continuity between terminals 80 and 80*a* is therefore interrupted, and, at the same time, a positive electrical connection is made between terminal 80 and shield 54 through spring 82 and contact 100 for an important purpose to be described in detail shortly.

Unit 93 is provided with an identical contact 100*a* between contact 88*a* and terminal 80*a*. Contact 100*a* is normally biased by spring 82*a* through an unshown aperture to protrude into the interior of sleeve 14.

When plug 16 is inserted into sleeve 14, shield 54 slidably engages contact 100*a*, pushing it outwardly to flex the free end of spring 82*a* away from the side of sleeve 14. As a consequence, contact 88*a* is separated from contact pin 90 to interrupt the circuit continuity between terminals 80 and 80*a*.

So that the internal circuits between pins 19 and 21 and between pins 20 and 22 may be interrupted without establishing an unwanted ground connection through shield 54 when plug 16 is inserted into sleeve 12, assembly 10 is provided with a pair of arms 108 and 109 (see FIG. 5) which are each made from a suitable electrically nonconductive material such as plastic. The corresponding ends of arms 108 and 109 are pivotally mounted on block 11 within recesses 30 and 31 respectively. The pivot axes of arms 108 and 109 are axially aligned.

Arms 108 and 109 extend longitudinally along their recesses and respectively overlie the flexure spring arms 44 and 46. Flexure spring arms 44 and 46 respectively engage and bias arms 108 and 109 outwardly through aperture 48 and into the interior of sleeve 12. The pivotally mounted ends of arms 108 and 109 engage the intermediate portions of springs 43 and 44 to limit outward flexing movement of arms 44 and 46 into the interior of sleeve 12.

When plug 16 is inserted into sleeve 12 in the manner shown in FIG. 3, shield 54 slidably engages the free, biased ends of arms 108 and 109 to depress them downwardly through aperture 48 and into recesses 30 and 31 respectively without contacting springs 42 and 43. As shield 54 is slid over arms 108 and 109, camming them into recesses 30 and 31, arms 108 and 109 urge spring arms 44 and 46 out of contact with pins 19 and 20 and downwardly through aperture 48 into recesses 30 and 31 respectively. Thus, when plug 16 is fully inserted to establish contact between contact element 50 and pin 19 and between element 51 and pin 20, springs 42 and 43 have been flexed out of contact with pins 19 and 20 to interrupt the normal through circuits between pins 19 and 21 and between pins 20 and 22.

From the foregoing it is clear that insertion of plug 16 into sleeve 12 accomplishes four switching operations:

First, electrical continuity between shield 54 and terminal 80 is established; second, the electrical circuit between terminals 80 and 80*a* is interrupted; third, the normal through circuits between pins 19 and 21 and between pins 20 and 22 are interrupted; and finally, patched-in circuit connections are completed between element 50 and pin 19 and between element 51 and pin 20. The first two switching operations occur at the same time upon initial insertion of plug 16 into sleeve 12. Further insertion of the plug then engages arms 108 and 109 after contact 100 is engaged. This results in the third switching operation in the manner just described. The final switching operation mentioned above occurs as plug 16 is advanced to its fully inserted position where the inner end of shield 54 seats against block 17.

Associated with sleeve 14 is a spring engaging arm assembly 111 (see FIG. 6) which is the same as the assembly of arms 108 and 109, like reference numerals suffixed by the letter *a* being applied to designate like parts. Arm 108*a* is pivotally mounted in and extends longitudinally along recess 34 in overlying relation to spring arm 45. Arm 109*a* is pivotally mounted in and extends longitudinally along recess 35 in overlying relation to spring arm 47. The pivot axes of arms 108*a* and 109*a* are axially aligned and are parallel with the pivot axes of arms 108 and 109.

The free ends of arms 108*a* and 109*a* are respectively engaged and biased by spring arms 45 and 47 through aperture 49 and into sleeve 14. The pivot ends of arms 108*a* and 109*a* respectively engage the intermediate portions of springs 43 and 44 to limit outward flexing movement of spring arms 45 and 47.

Arms 108*a* and 109*a* coact with springs 43 and 44 and with plug 16 in the same manner described for arms 108 and 109. Thus when plug 16 is inserted into sleeve 14, shield 54 slidably engages arms 108*a* and 109*a*, without contacting springs 42 and 43, to pivotally urge arms 108*a* and 109*a* outwardly and into their respective recesses 34 and 35, thereby flexing spring arms 45 and 47 out of contact with contact pins 21 and 22 and into the recesses.

As shown, spring arms 44 and 45 are offset from the intermediate portion of spring 42 so that only the ends of arms 108 and 108*a* engage the spring. By this construction, the outward flexing motion of spring arms 44 and 45 is confined by the pivoted ends of arms 108 and 108*a*, while at the same time the free ends of arms 108 and 108*a* are normally biased by the spring into the interior of their respective sleeves.

The construction of spring 43 and coaction with arms 109 and 109*a* are the same as that just described for spring 42 and arms 108 and 108*a*.

It is apparent from the foregoing that four switching operations also take place when plug 16 is inserted into sleeve 14. Initial insertion of the plug slidably engages contact 88*a* to flex spring arm 82*a* outwardly to a position where contact 100*a* separates from contact pin 90. As a result, the circuit between terminals 80 and 80*a* is interrupted and a positive current path is established between terminal 80*a* and shield 54. Upon further insertion of plug 16, shield 54 engages arms 108*a* and 109*a* to depress spring arms 45 and 47 to a position where they are out of contact with pins 21 and 22, thereby interrupting the normal through circuits between pins 19 and 21 and between pins 20 and 22. When plug 16 is fully inserted, the new or patched-in circuit connections are completed between pin 21 and contact element 50 and between pin 22 and contact element 51.

In the sample shown in FIG. 9, plug 16 is adapted to be connected to a standby receiver 120 by a suitable, shielded two-wire signal transmitting patchord 1244 which may be of the same construction as cable 60. Accordingly, like reference characters suffixed by the letter *b* have been applied to designate like elements of patchcord 122.

Conductors 57*b* and 58*b* are electrically connected at corresponding ends to the output terminals of receiver 120 as shown in FIG. 9. The opposite ends of conductors 57*b* and 58*b* are permanently connected as by soldering to contact elements 50 and 51 respectively. Shield 62*b* is grounded at receiver 120 in the usual manner. The opposite end of shield 62*b*, according to this invention, is crimped in a collar 124 which electrically connects shield 62*b* to shield 54 of plug 16.

For the electrical connections shown in FIG. 9, the insertion of plug 16 into sleeve 14 interrupts the normal through circuit between receiver 72 and amplifier 74 to patch receiver 72 out of the active circuit. In place of receiver 72, receiver 120 is patched into the active circuit since insertion of plug 16 into sleeve 14 electrically connects conductors 57*b* and 58*b* to conductors 57*a* and 58*a*. Thus operation of circuit 75 may continue while receiver 120 is patched out for repairs or maintenance.

When plug 16 is inserted into sleeve 14 to patch receiver 72 out of the active circuit, the electrical connection between shields 62 and 62*a* is interrupted to prevent the development of unwanted ground loops. Insertion of plug 16 furthermore electrically connects shield 62*b* to shield 62*a*, thereby completing electrical continuity of the shielding between receiver 120 and amplifier 74 when the former is patched into the active circuit to reduce noise pick-up and cross-talk.

According to another important aspect of this invention, an impedance-balancing resistor 130 is coaxially mounted in a bore 132 formed through block 11 along an axis extending perpendicularly with respect to the longitudinal axes of recesses 30, 31, 34, and 35. Bore 132 radially opens into recesses 30 and 31 on one side and radially opens into recesses 34 and 35 on the opposite side.

The opposite ends of resistor 130 terminate in annular terminals 134 and 135. Terminal 134 protrudes into recesses 30 and 34, and terminal 135 protrudes into recesses 31 and 35. When plug 16 is inserted into sleeve 12, the inwardly bent ends of spring arms 44 and 46 are respectively urged into contract with terminals 134 and 135. Therefore the patched-out network or circuit component connected to contact pins 21 and 22 is terminated in resistor 130.

Similarly, when plug 16 is inserted into sleeve 14, the inwardly bent ends of spring arms 45 and 47 are urged into contact with terminals 134 and 135 respectively. As a result, the patchout network or circuit component, which is connected to contact pins 19 and 20, is terminated in or, more specifically, electrically connected across resistor 130.

The foregoing circuit arrangement is particularly useful in audio circuits of the type shown in FIG. 9, for, as previously mentioned, when the patched-out component or network such as receiver 72 is not terminated in a matching impedance, unwanted ambient system noise may develop. In this connection, it will be appreciated that the source impedance (receiver 72, for example) and the load impedance (amplifier 74) are commonly matched to obtain maximum operating power. The value of resistor 130 is therefore preferably selected to closely balance the matched source and load impedances.

It is apparent from the foregoing that when receiver 72 is patched-out of the active circuit by inserting plug 16 into sleeve 14, the patch-out receiver is terminated in or connected across resistor 130 which has a preselected value adapted to match the receiver impedance.

In order to patch amplifier 74 out of the active circuit, an additional switch assembly 140 is required between amplifier 74 and speaker 76 as schematically illustrated in FIG. 9. Assembly 140 is of the same construction as assembly 10, like reference characters suffixed by the letter *c* being applied to designate like parts.

Interconnecting switch assembly 140 and amplifier 74 is a dual-conductor, signal-transmitting line which may be the same as cable 60, like reference numerals suffixed by the letter *c* being applied to designate like elements.

A similar dual-conductor, signal-transmitting line also may be employed to connect the output terminals of assembly 140 to the input terminals of speaker 76. Like reference numerals suffixed by the letter *d* have been used to designate like elements of this latter signal-transmitting line.

Still referring to FIG. 9, conductors 57*c* and 58*c* respectively connect the output terminals of amplifier 74 to the terminal ends of contact pins 19*c* and 20*c*. Shield 62*c* is grounded at amplifier 74 and is connected at its opposite end to terminal 80*c*. The input terminals of speaker 76 are respectively connected by conductors 57*d* and 58*d* to the terminal ends of contact pins 21*c* and 22*c*. Shield 62*d* is grounded at speaker 76 and connected at its opposite end to terminal 80*ac*. Thus, for a normal through circuit condition wherein the output of amplifier 74 is coupled to speaker 76, the continuity of the conductor shielding (shields 62*c* and 62*d*) is maintained.

As shown in FIG. 9, a standby amplifier 142 is conveniently provided to be patched into the active circuit when amplifier 74 is patched out. The input terminals of amplifier 142 are electrically connected to respective contact elements of a further plug 44 by a patchcord 146. Plug 144 and patchcord 146 are respectively of the same construction as plug 16 and cable 60, like reference numerals suffixed by the letter *e* being applied to designate like elements.

As shown, the patchcord shield 62*e* is grounded at amplifier 142 and is electrically connected at its opposite end to shield 54*e*.

Similarly, the contact elements of a third plug 148 are respectively connected by a patchcord 150 to separate output terminals of amplifier 142. Plug 148 and patchcord 150 are respectively of the same construction as plug 16 and cable 60, like reference numerals suffixed by the letter *f* being applied to designate like elements. The patchcord shield 62*f* is grounded at one end at amplifier 142 and is connected at its opposite end to shield 54*f* of plug 148.

To patch amplifier 74 out of the active circuit and to patch the standby amplifier 142 in, plug 144 is inserted into sleeve 12 of assembly 10 and plug 148 is inserted into the sleeve of assembly 140 which corresponds to sleeve 14. As a result, the the normal through circuits between receiver 72 and amplifier 74 and between amplifier 74 and speaker 76 are interrupted. In addition, circuit continuity of the conductor shielding envelopes between receiver 72 and amplifier 74 and between amplifier 74 and between amplifier 74 and speaker 76 are also interrupted. Receiver 72 will now be connected to the input terminals of ampliifier 142, and speaker 76 will now be connected to the output terminals of amplifier 142. The output terminals of amplifier 74 will be connected across the unshown impedance balancing resistor (corresponding to resistor 130) in assembly 140. Furthermore, the input terminals of amplifier 74 are connected across resistor 130 in assembly 10.

With amplifier 142 patched into the active circuit, continuity between the conductor shields 62 and 62*c* is established. Also continuity between shields 62*f* and 62*d* will be established.

It further is apparent that both receiver 72 and amplifier 74 may concomitantly be replaced by standby receiver 120 and standby amplifier 142. In such a patching operation both of the plugs 16 and 144 are inserted into sleeves 14 and 12 respectively, and plug 148 is inserted into the sleeve of assembly 140 corresponding to sleeve 14 of assembly 10. Accordingly, both of the patched-out amplifier 74 and the patched-out receiver 72 will be terminated in their associated impedance-balancing resistors in the manner previously described. It is to be noted that with these patched circuit connections, resistor 130 of assembly 10 is connected across the output terminals of receiver 72 as well as the input terminals of amplifier 74.

The maximum shielding afforded by the patchfield switch assembly of this invention permits high and low level audio circuits to be connected on a common patchfield.

Preferably, plug shield 54 is formed with a longitudinal key 150 (see FIG. 1) which is adapted to interfit in a groove 151 in sleeve 12 or in a groove 152 in sleeve 14. This key and groove construction ensures a one-way orientation of plug 16 in either sleeve 12 or sleeve 14 to establish the proper circuit connections.

What is claimed and desired to be secured by Letters Patent is:.

1. An electrical switch assembly comprising a pair of signal input terminals and a pair of signal output terminals, a female receptacle receiving one of said input and output terminal pairs, a plug having a pair of terminal elements for providing an electrical connection to an external electrical network, said plug being removably inserted into said receptacle to contact said terminal elements with respective terminals of said one pair, means for completing a first circuit between one of said input terminals and one of said output terminals when said plug is removed from said receptacle, means for completing a second circuit between the other of said input terminals and the other of said output terminals when said plug is removed from said receptacle, an impedance component normally disconnected from said first and second circuit completing means when said first and second circuits are completed, and means cooperating with said plug for electrically breaking said first and second circuits and for electrically connecting the terminals of the other of said input and output terminal pairs to the terminals of said impedance component when said plug is inserted into said receptacle.

2. The electrical switch assembly defined in claim 1 wherein said first circuit completing means comprises a first movable contact element normally contacting one terminal of said one of said terminal pairs in said receptacle, wherein said second circuit completing means comprises a second movable contact element normally contacting the other terminal of said one of said terminal pairs, and wherein s aid first and second contact elements are disengaged from their associated terminals of said one terminal pair and urged into contact with respective terminals of said impedance component by insertion of said plug into said receptacle.

3. The electrical switch assembly defined in claim 2 wherein each of said contact elements is formed by an electrically conductive flexure spring member.

4. An electrical switching assembly for providing circuit connections to first, second, and third shielded electrical conductors in a patchfield and comprising a body section, a pair of female receptacles rigid with said body section, at least one signal input terminal for providing an electrical connection to said first electrical conductor in said patchfield and being received in one of said receptacles, at least one signal output terminal for providing an electrical connection to said second shielded electrical conductor in said patchfield and being received in the other of said receptacles, an electrically conductive flexure spring member carried by said body section and having arms normally contacting respective ones of said terminals to complete a circuit therebetween, a plug having at least one terminal element for providing an electrical connection to said third shielded electrical conductor in the patchfield, said plug being removably inserted into a selected one of said receptacles to establish electrical contact between the one of said terminals received therein and said terminal element and to flex the associated arm out of contact with said one terminal for interrupting said circuit, and means for maintaining said flexure spring member electrically isolated from the shields of said first, second, and third conductors both when said plug is inserted into either one of said receptacles and removed from said receptacles.

5. The electrical patchfield switching assembly defined in claim 4 wherein said spring member is formed with an intermediate section extending through said body section and wherein said arms extend in corresponding directions from said intermediate section and through apertures in their associated receptacles to contact the terminals therein.

6. The electrical patchfield switching assembly defined in claim 5 wherein said means for maintaining said flexure spring member electrically isolated from the shields of said first, second and third electrical conductors comprises a part engageable with each of said arms and formed from electrically non-conductive material, each part being pivotably mounted on said body section and being normally biased by its associated arm into the interior of the receptacle into which the arm normally extends, said plug having an external, electrically conductive shield which when inserted into either receptacle engages and pivots said parts therein in a direction to flex the associated arm out of contact with the terminal in the receptacle, each part being effective to prevent electrical contact between said shield of said plug and said spring member when said plug is inserted into either of said receptacles.

7. An electrical jack type switch assembly comprising female receptacle means having a first terminal for providing an electrical connection to a first shielded, electrical conductor, plug means having a terminal element for providing an electrical connection to a second shielded electrical conductor and being selectively removably inserted into said female receptacle means to establish an electrical circuit connection between said first terminal and said terminal element, a second terminal for providing an electrical connection to a third shielded electrical conductor first and second terminal members for providing electrical connections to the shields of said first and third conductors respectively, and switching means actuated by removal of said plug means from said receptacle means to electrically connect said first terminal and said first terminal member respecttively to said second terminal and said second terminal member, said switching means cooperating with said plug means when the latter is inserted into said receptacle to disconnect said first terminal and said first terminal member from said second terminal and said second terminal member respectively.

8. The electrical jack type switch assembly defined in claim 7 wherein said switching means provides a first current path for interconnecting said first and second terminals and a second current path for interconnecting said terminal members, and wherein said plug means further comprises an electrically conductive part electrically insulated from said terminal element for providing an electrical connection to the shield of said second conductor, said part coacting with a portion of said second current path for establishing electrical continuity between the shields of said second conductor and said first conductor when said plug means is received in said receptacle means.

9. The electrical jack type switch assembly defined in claim 7 wherein said switching means comprises first current path defining means for interconnecting said first and second terminals and second current path defining means for interconnecting said terminal members, and first and second contact means respectively forming parts of said first and second current path defining means, said first and second contact means being actuated by the selective insertion of said plug means into said receptacle means to interrupt the continuity of the current paths defined by said first and second current path defining means.

10. The electrical jack type switch assembly defined in claim 9 wherein said first and second contact means are sequentially actuated by displacement of said plug means toward a predetermined position in said receptacle means.

11. The electrical jack type switch assembly defined in claim 9 wherein said plug means further comprises an electrically conductive shield portion electrically insulated from said terminal element for providing an electrical connection to the shield of said second conductor, and wherein said shield portion cooperates with a portion of said second current path defining means when said plug means is received in said receptacle means for establishing electrical continuity between the shields of said first and second conductors.

12. The electrical jack type switch assembly defined in claim 11 wherein said portion of said second current path defining means extends externally of said receptacle means and has a contact element extending through an aperture in said receptacle means for electrically contacting said shield portion of said plug means when said plug means is received in said receptacle.

13. The electrical jack type switch assembly defined in claim 12 wherein said portion of said second current path defining means comprises a flexible leaf-like spring arm, and wherein said second contact means comprises a pair of engageable contacts with one of said contacts being carried by said arm which when relaxed urges said one contact into engagement with the other of said contacts, the engagement of said shield portion of said plug means with said contact element flexing said arm to a position where said one contact is moved out of engagement with said other contact.

14. In a patchfield circuit having first, second, and third shielded, electrical signal-transmitting conductors and a jack type switching assembly comprising switching means normally providing a first circuit connection between said first and second shielded conductors and a second circuit connection between the shields of said first and second conductors, at least one receptacle associated with said first conductor and plug means connected to said third conductor and the shield therefor and being selectively removably inserted into said receptacle for connecting said third conductor and its shield respectively to said first conductor and its shield and for actuating said switching means to electrically disconnect said second conductor and its shield respectively from said first conductor and its shield.

15. An electrical jack type switch assembly comprising first and second terminals for respectively providing electrical connections to separate first and second shielded, electrical conductors, first and second terminal members for providing electrical connections to the shields of said first and second conductors respectively, switch means providing normal through circuits for connecting said first terminal and said first terminal member respectively to said second terminal and said second terminal member, plug means having first and second terminal elements for respectively providing electrical connections to a third shielded electrical conductor and its shield, a receptacle associated with said first terminal and said first terminal member and removably receiving said plug means to establish electrical connections between said first terminal element and said first terminal and between said second terminal element and said first terminal member, said switching means being actuated by reception of said plug means in said receptacle for electrically disconnecting and electrically isolating said second terminal and said second terminal member from said first terminal and said first terminal member.

16. An electrical patchfield jack type switch assembly comprising plug-receiving receptacle means having a first terminal pair providing for electrical connections to a pair of conductors in a first shielded, dual conductor, electrical signal-transmitting cable, a second terminal pair providing for electrical connections to a pair of conductors in a second shielded, dual conductor, electrical signal-transmitting cable, first and second terminal members for providing electrical connections to the shields of said first and second cables respectively, switching means normally connecting said first terminal pair and said first terminal member respectively to said second terminal pair and said second terminal member, an impedance having a pair of terminals and being normally disconnected from said first and second terminal pairs when said terminal pairs are interconnected, a plug having a third terminal pair providing for electrical connections to a pair of conductors of a third shielded, dual conductor, electrical signal-transmitting cable and a terminal element providing for an electrical connection to the shield of said third cable, said plug being selectively, removably inserted into said receptacle means for connecting said third terminal pair and said terminal element respectively to said first terminal pair and said first terminal member, for electrically disconnecting said second terminal pair from said first terminal pair, for connecting the terminals of said second terminal pair to the terminals of said impedance, and for electrically disconnecting and electrically isolating said second terminal member from said first terminal member.

17. An electrical switch assembly for controlling the connection between first and second dual conductor cables each having a pair of inner conductors and a shield around said inner conductors, said electrical switch assembly comprising first and second pairs signal transmission terminals providing connections to the inner conductor pairs of said first and second cables respectively, a receptacle, plug means selectively removably inserted into said receptacle, an electrical impedance component, and switching means for electrically connecting the terminals of said first pair to respective ones of the terminals of said second pair and being actuated by insertion of said plug means into said receptacle to disconnect said terminal pairs from each other and to connect the terminals of a disconnected one of said first and second pairs respectively to the terminals of said impedance component, whereby the terminals of said disconnected one of said pairs of terminals are bridged by said impedance component when disconnected from the other of said first and second pairs.

18. The electrical switch assembly defined in claim 17 compriing means normally providing an electrical connection between the shields of said first and second cables and having contact means actuated by insertion of said plug means into said receptacle for interrupting said electrical connection between the shields of said first and second cables, and means for electrically isolating said impedance component and said switching means from said electrical connection between the shields of said first and second cables.

19. The elecrtical switch assembly defined in claim 17 comprising means for maintaining said impedance component electrically isolated from the shields of said first and second cables when said plug means is both inserted into and removed from said receptacle.

References Cited

UNITED STATES PATENTS

| | | | |
|---|---|---|---|
| 3,109,997 | 11/1963 | Giger et al. | 333—8 |
| 2,344,780 | 3/1944 | Kram et al. | 333—7 |
| 2,725,440 | 11/1955 | Kamm | 333—7 X |
| 2,779,005 | 1/1957 | Tanner et al. | 333—7 X |
| 2,958,054 | 10/1960 | Concelman | 333—7 |
| 3,132,311 | 5/1964 | Wozniak | 333—7 |
| 3,182,270 | 5/1965 | Horton | 333—7 |
| 3,331,991 | 7/1967 | Carlisle et al. | 333—7 X |
| 3,373,360 | 3/1968 | Wilson | 333—7 X |

PAUL L. GENSLER, Primary Examiner

U.S. Cl. X.R.

200—51, 51.1; 333—8